UNITED STATES PATENT OFFICE 2,355,078

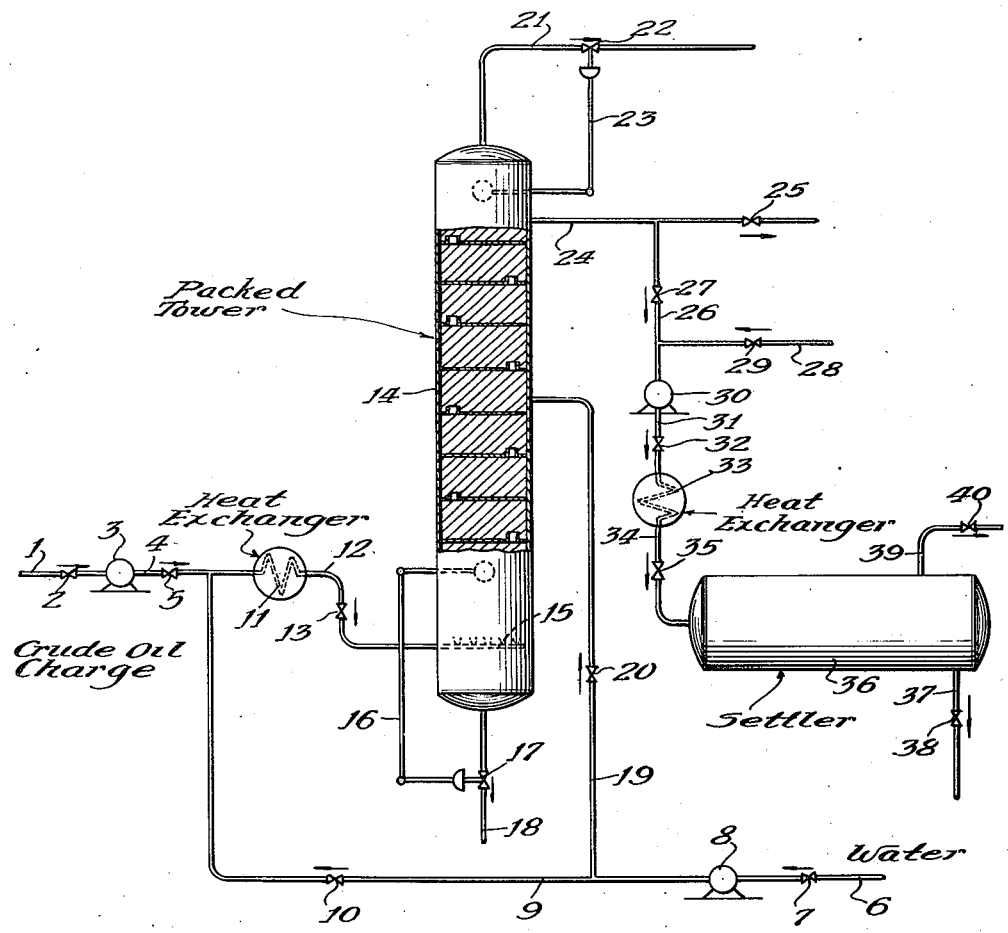

TREATMENT OF HYDROCARBONS

Harley R. Johnson, Tulsa, Okla.

Application November 1, 1943, Serial No. 508,498

6 Claims. (Cl. 252—322)

This is a continuation-in-part of my copending applications Serial Numbers 415,380 and 415,381 filed October 17, 1941.

This invention relates to a process for treating oils to remove foreign material therefrom. More particularly, it relates to the removal of salt and other undesirable suspended inorganic materials from crude petroleum oils. Still more specifically, it relates to desalting crude oils which contain crystalline salt such as sodium chloride, magnesium chloride, calcium chloride, etc.

Certain crude oils contain sodium chloride and other inorganic salts in the form of suspended crystals of more or less irregular size. These crystals are usually surrounded by oily or asphaltic films difficult to penetrate and, as a consequence, the removal of salt from such crude oils by the usual methods presents a difficult problem. Thus, for example, when contacting the salt-containing oil with water, the film around the salt particle prevents the water from coming in contact with the salt crystal and, as a consequence, methods employing the washing of the crude oil with hot water are not effective in reducing the salt content to an acceptable figure. Thus, the reduction of salt content to less than 20 pounds of salt per 1000 barrels of oil is, in many instances, technically difficult and economically not feasible. The present invention offers a method for accomplishing the economic reduction of salt content of crude oils to a relatively low figure.

The presence of salt, either in the form of an emulsion or of suspended crystals is objectionable because of the fact that when the oil is cracked, the salt accelerates the deposition of foreign material including coke in the tubes and other parts of the plant, resulting in increased costs for clean-outs and shorter period of operation. By removing salt and other foreign material it is possible to improve the results obtained in the cracking plant.

In a broad aspect the present invention relates to steps in a process for the desalting of oil which comprise treating the oil with a brine solution at an elevated temperature not in excess of about 200° F., separating the oil from the brine solution, and contacting the oil substantially free of brine with a porous filtering material maintained in a wet condition.

In one specific embodiment the present invention comprises treating crude oil containing crystalline salt with water at an elevated temperature not in excess of about 200° F., passing the mixture through a pool of brine, separating the oil from the brine, passing the oil substantially free of brine through a bed of porous filtering material which will not disintegrate under the conditions of treatment, simultaneously introducing water to an intermediate point in said bed of filtering material in order to maintain the same in a wet condition, and thereafter treating the oil to separate the salt therefrom.

The exact manner in which the brine treatment followed by the filtering treatment functions is not fully understood. It is known that a small amount of solid suspended material such as shale or mud, including some salt, is removed but the salt content of the oil is rarely reduced more than about 20–25% and the reduction is not of a commercially feasible amount. Microscopic examination of an oil containing suspended salt crystals shows that they vary in size in the oil as it is produced. The crystals appear to become of a more uniform size after passage through the brine treatment and the filtering step. Another important function of these steps appears to be the breaking up or disintegration of the film of oil or asphaltic material surrounding the suspended salt crystals in such a manner that conventional desalting methods may subsequently be employed in order to dissolve the salt particles. Thus, in a broad aspect, the present invention may be considered as a step in preconditioning the crude oil to convert the salt particles into a form that they may be readily removed by known methods, including treatment with water at an elevated temperature, electrical precipitation, etc.

One embodiment of the invention is illustrated in the accompanying drawing which is diagrammatic and should not be construed as unduly limiting the invention.

The salt-containing crude oil is introduced to the process through line 1, valve 2, pump 3, line 4 and valve 5. As previously mentioned, crude oils containing salt crystals in suspension are particularly adapted to treatment by this process, although other oils may be treated as well, often with improved results. The process is particularly useful in treating oils which are difficult or impossible to desalt by conventional methods, and it is with such oils that the advantages of the process become the most apparent. The oil is mixed with water introduced to the process through line 6, valve 7, pump 8, line 9 and valve 10 into line 5. The water introduced through line 6 may or may not be preheated, as desired, and preferably is treated water as, for example, boiler water which has been heated to reduce its total hardness. The mixture of oil and water are passed through heat exchanger 11 or its equivalent wherein the mixture is heated to an elevated temperature which generally will not be in excess of about 200° F. Actual operations have shown that temperatures in excess of 200° F. will effect greater salt removal in the filtering step of the process than is obtained at temperatures below 200° F., but the salt content of the crude oil after the final stage of the process is higher, and it is for this reason that the mixture is heated to temperatures of below about 200° F. in heat exchanger 11.

In some cases, it may be desirable to commingle a neutralizing agent with the oil and/or water. The neutralizing agent may be alkaline or acidic, depending upon whether the oil undergoing treatment is acid or alkaline.

The heated mixture of oil, water and neutralizing agent, if employed, is passed through line 12 containing valve 13 into packed tower 14, preferably through some sort of spray arrangement indicated at 15. A pool of brine is maintained in the lower portion of this tower below the packing. This phase of the treatment may also be carried out in a separate vessel. Any suitable method of controlling the liquid level in the lower portion of tower 14 may be employed such as liquid level controller 16 which actuates valve 17 in line 18. When desired, a regulated portion of the brine withdrawn from line 18 may be supplied, by well known means not illustrated, into line 4 to commingle with the oil and thus may replace all or a portion of the water introduced thereto through lines 6 and 9.

In practical operations it has been found that improved results are obtained when the level of brine in tower 14 is maintained below the packing as otherwise there is a tendency of the brine and oil to flood the tower and overflow.

The brine solution used may vary considerably in composition but the optimum range of concentration has been found to be about 3–10% by weight of salts, of which sodium chloride may form a major constituent. The quantity of brine is usually about 2–15% by volume, based upon the crude oil charge. It has been found that the use of brine gives superior results over those obtained with pure water.

The entering mixture of oil and water passes upward through the pool of brine and a separation of oil from brine occurs. The oil substantially free of brine is then passed upwardly through the tower which contains a porous filtering material. By the terminology "substantially free of brine," it is not intended to exclude the oil containing a minor amount of water and the amount of water will usually be below 4% by volume of the oil.

For improved results, it is essential that the filtering material be kept in a wet condition and this may be accomplished in part by the small amount of water which is carried over in the oil and it may be accomplished, all or in part, by diverting a portion of the water introduced through line 6 and passing the same through line 19 containing valve 20 into an intermediate point in the bed of filtering material. The exact point of introduction will depend upon the velocity of oil in tower 14 since it is desired that substantially all of the water introduced by this means flows downwardly in the tower in order to wet the filtering material. A small amount of the water may be carried upwardly with the oil, wetting the packing lying above the point at which the water is introduced, but most of the water flows downwardly, and the velocities are maintained at a rate to effect this. The water thus introduced at an intermediate point in tower 14 may replace at least a part of the water commingled with the oil in line 4.

The design of tower 14 is not limited to any one particular form and may comprise any suitable type of apparatus in order to obtain the desired contacting. One satisfactory apparatus consists of a vertical shell containing bubble decks from which the caps have been removed and the filtering material disposed on the trays, so that the upwardly rising oil is passed through the filtering material by way of a tortuous path.

Any suitable packing material may be employed, but not necessarily with equivalent results, and thus may comprise fibrous substances such as excelsior, coarse saw dust, wood shavings, hay, cereal straws, mineral wool, rock wool, asbestos, etc., or it may consist of granular porous materials such as limestone, caliche of the limestone type, pumice, fire-brick and other porous materials which will not disintegrate by contact with the oil and/or water under the conditions of treatment. Excelsior is particularly beneficial because of its form which permits a ready passage of the oil and at the same time affords satisfactory contact. After being used for a considerable time, the filtering material loses its effectiveness and this may be restored in part by treating it with steam and/or other solvents, thereby removing coatings of oil or other material from the packing. In some cases, the filtering material is sufficiently cheap and the length of time for which it can be used is sufficiently long so that it hardly pays to resort to recovery methods but rather merely to replace the filtering material from time to time. The packing material should be preferentially wetted by water instead of oil.

The combined brine and filtering treatment effects comparatively little removal of salt from the oil as is shown by the fact that an oil entering with about 200 pounds of salt per 1000 barrels of oil leaves the top of the packed tower with only about 20% reduction in salt content. What the brine and filtering treatments accomplish is a preconditioning of the oil so that it is readily removable by conventional methods which, in the absence of the brine and filtering treatments, either cannot be done, or is accomplished only with difficulty.

The temperature maintained in the packed tower is substantially the same or slightly lower than that to which the mixture of oil and brine is heated in exchanger 11 and thus will be in the range of from about 100° to about 200° F. Relatively low pressures may be used but it must be sufficient to prevent undue vaporization.

The upper portion of tower 14 is usually empty of packing material. It may serve as a means for separating any gas which is dissolved in the crude oil and which is liberated at the temperature and pressure used. The gas passes out of the tower through line 21 and valve 22 which may be actuated by liquid level controller 23 or its equivalent. This gas may be sent to a suitable recovery system or it may be sent to the crude oil fractionator.

The crude oil is withdrawn through line 24 and valve 25 and now is in condition for the ready removal of the salt by conventional methods. One suitable conventional method is illustrated in the drawing and this comprises passing the oil through line 26 containing valve 27, and commingling therewith water entering through line 28 containing valve 29. Although not illustrated in the drawing, it is within the scope of the invention to install a suitable mixing device in order to effect the desired mixing of the oil and water. The mixture is then directed to pump 30 by means of which it is supplied through line 31 containing valve 32, heat exchanger 33, line 34 and valve 35 into settler 36. The amount of water commingled with the oil in line 26 must be sufficient so that the deposition of salt does not occur to any appreciable extent in heat exchanger 33. It has been found that the amount of water in the oil at this stage must be at least 4% by volume and it is generally preferred to use a larger amount of water.

In heat exchanger 33 the mixture of oil and water is heated to a temperature above that employed in the brine and filtering treatments and this temperature may be within the range of from about 200° to about 400° F. or more and usually of from about 280° to about 350° F. The pressure employed must be sufficient in order to maintain the oil and water in liquid phase.

The water introduced through line 28 likewise is preferably comparatively soft and may comprise treated boiler water. Settler 36 may comprise any suitable settling zone and a horizontal settler as illustrated has been found satisfactory although the invention is not limited thereto. Water containing dissolved salts is removed through line 37 and valve 38, and the desalted crude oil is removed through line 39 and valve 40 to subsequent consumption in the refinery.

It is understood that the system illustrated by settler 36, although being the preferred method, is not the only method which may be used for effecting the separation of the salt from the oil. Any other suitable method may be employed including, for example, electrical precipitation methods.

The following examples illustrate the process of the invention but not with the intention of unduly limiting the same.

*Example I*

West Texas crude oil from Slaughter Field contains large quantities of salt which may vary from 150 to 250 pounds per 1000 barrels and even more. It has been found that the results obtainable by the present process are substantially the same whether the crude oil contains 150 or 250 pounds of salt per 1000 barrels of oil.

When operating according to my invention using 5% by volume of a 6% brine solution at a temperature of 190° F. and a pressure of 35 pounds per square inch in the brine and filtering treatment, the filtering material comprising excelsior, the salt content of the crude oil may be reduced to less than 20 pounds per 1000 barrels of oil in a horizontal settler similar to settler 36, utilizing a temperature of 350° F. and a pressure of 240 pounds per square inch.

*Example II*

When operating substantially in the manner described in Example I and varying the percent of salt removed in the excelsior tower by modifying conditions accordingly, it has been found that lower salt contents of the final crude oil are obtained when the percent of salt removed from the excelsior tower is lower. This is shown in the following table:

| Salt removal in packed tower, percent | Final salt content #/1,000 barrels |
| --- | --- |
| 0 | 18 |
| 5 | 19 |
| 10 | 21 |
| 15 | 23 |
| 20 | 24 |
| 25 | 26 |
| 30 | 28 |
| 35 | 32 |
| 40 | 38 |

*Example III*

When operating in a manner similar to that described in Example I but varying the temperature in the excelsior tower, it has been found that lower temperatures are more effective than higher temperatures as indicated by the following table.

| Inlet temperature of packed tower, °F. | Final salt content #/1,000 barrels |
| --- | --- |
| 140 | 16 |
| 150 | 18 |
| 160 | 20 |
| 170 | 22 |
| 180 | 24 |
| 190 | 26 |
| 200 | 28 |

*Example IV*

In an operation such as described in Example I but utilizing granular caliche as the packing material, it was found that the crude oil is reduced to a salt content of less than 20 pounds per 1000 barrels of oil when subsequently treated in a system similar to that described in connection with settler 36.

I claim as my invention:

1. In a process for the desalting of oil, the steps which comprise treating the oil with a brine solution at an elevated temperature not in excess of about 200° F., separating the oil from the brine solution, and contacting the oil substantially free of brine with a porous filtering material which will not disintegrate under the conditions of treatment and which is maintained in a wet condition.

2. The process of claim 1 further characterized in that said filtering material comprises excelsior.

3. The process of claim 1 further characterized in that said filtering material comprises caliche of the lime-stone type.

4. A process for desalting crude oil which comprises treating the oil with a brine solution at an elevated temperature not in excess of about 200° F., separating the oil from the brine solution, contacting the oil substantially free of brine with a porous filtering material which is preferentially wetted by water and which will not disintegrate under the conditions of treatment, and thereafter treating the oil to separate the salt therefrom.

5. A process for desalting crude oil which comprises mixing the oil with water, heating the mixture to an elevated temperature not in excess of about 200° F., passing the mixture through a pool of brine solution, separating the oil from the brine, passing the oil substantially free of brine through a bed of porous filtering material which will not disintegrate under the conditions of treatment, and which is maintained in a wet condition, and thereafter treating the oil to separate the salt therefrom.

6. A process for desalting crude oil which comprises mixing the oil with water, heating the mixture to an elevated temperature not in excess of about 200° F., passing the mixture through a pool of brine solution, separating the oil from the brine, passing the oil substantially free of brine through a bed of porous filtering material which will not disintegrate under the conditions of treatment, simultaneously introducing water to an intermediate point in said bed of filtering material in order to maintain the same in a wet condition, and thereafter treating the oil to separate the salt therefrom.

HARLEY R. JOHNSON.